United States Patent [19]
Gates, Jr. et al.

[11] 3,765,912
[45] Oct. 16, 1973

[54] MGO-SIC LOSSY DIELECTRIC FOR HIGH POWER ELECTRICAL MICROWAVE ENERGY

[75] Inventors: Louis E. Gates, Jr., Inglewood; William E. Lent, Los Angeles, both of Calif.

[73] Assignee: Hughes Aircraft Company, Culver City, Calif.

[22] Filed: Jan. 7, 1971

[21] Appl. No.: 104,810

Related U.S. Application Data

[60] Division of Ser. No. 814,830, April 9, 1969, Pat. No. 3,634,566, and a continuation-in-part of Ser. No. 586,649, Oct. 14, 1966, Pat. No. 3,538,205.

[52] U.S. Cl. .................... 106/44, 106/58, 333/81 R
[51] Int. Cl. .... C04b 35/04, C04b 35/56, H01p 1/22
[58] Field of Search ...................... 106/39 R, 58, 44; 264/65, 61; 333/81 A, 81 B

[56] References Cited

UNITED STATES PATENTS

| | | | |
|---|---|---|---|
| 3,476,690 | 11/1969 | Carnall | 106/58 X |
| 2,823,134 | 2/1958 | Atlas | 106/58 |
| 3,536,506 | 10/1970 | Fraser | 106/58 |
| 3,538,205 | 11/1970 | Gates et al. | 264/61 |
| 2,313,842 | 3/1943 | Rigterink | 106/39 R |
| 3,534,286 | 10/1970 | Holm et al. | 106/39 R |
| 3,562,679 | 2/1971 | Coale et al. | 333/81 B |
| 3,634,789 | 1/1972 | Stuckert | 333/81 A |
| 3,654,573 | 4/1972 | Graham | 333/81 A |

OTHER PUBLICATIONS

Siuger, F. et al.; Attenuator Materials, in Industrial Ceramics, New York, 1963 p. 1210 (TP807561i)

Kingery, W. D.; Ceramic Fabrication Processes (Magnesia), New York, 1958 pp. 148–150. (TP807K5)

*Primary Examiner*—Helen M. McCarthy
*Attorney*—W. H. MacAllister, Jr. and A. V. Oberholtzer

[57] ABSTRACT

A lossy dielectric for dissipating high power wave energy on the order of 100 to 1,800 watts comprised of a magnesia matrix press-formed of a dry blended mix of calcined magnesium oxide and 1 to 80 percent by weight silicon carbide.

2 Claims, No Drawings

MGO-SIC LOSSY DIELECTRIC FOR HIGH POWER ELECTRICAL MICROWAVE ENERGY

This is a division of application, Ser. No. 814,830, filed Apr. 9, 1969 (U.S. Pat. No. 3,634,566) and continuation-in-part of application, Ser. No. 586,649 filed Oct. 14, 1966, (U.S. Pat. No. 3,538,205) entitled "Method of Providing Improved Dielectric Structure for Dissipating Electrical Microwave Energy and Product."

The invention herein described was made in the course of or under a contract or subcontract thereunder with the Navy Department.

This invention relates to improvements in the method of increasing the efficiency of lossy dielectric materials in dissipating high power electrical microwave energy and the products obtained thereby. More particularly, the improvements concern the critical methods of providing an improved lossy dielectric material having the surprising ability to dissipate continuous power wattage on the order of 100 to 1,800 watts without requiring external water cooling and can be operated under conditions up to 1,200°C without undergoing physical damage, in comparison to any known commercially available material not having this ability.

In the technical field of providing high performance lossy dielectric material for microwave devices and components. the prior art has devised porous ceramic structures with carbonized sugar, metal oxides and carbides, oxidized nickel-iron alloys in sheet or wire form, and metallic surfaces coated with graphite. However, such structures have characteristics which reduce their use in airborne structures and particularly for use in dissipating high power as microwave loads and as attenuators and terminations in traveling wave tubes.

It is accordingly an object of this disclosure to provide the art with a method of fabricating improved lossy dielectric material which improves the efficiency of high power electrical energy dissipation and high thermal conductivity under conditions of continuous wave power.

Another object of this improvement in the art is to provide an improved method of processing for obtaining improved lossy dielectric compositions having high thermal conductivity for efficient absorption and dissipation of heat energy generated under conditions of continuous high energy wave power and environment and induced high temperatures.

A further object of this improvement in the art is to provide a critical method of preforming lossy dielectric composition for obtaining maximum thermal conductivity, minimizing porosity and attaining high uniform density to more efficiently absorb and dissipate high power microwave electrical energy.

Further, additional objects and advantages will be recognized from the following description wherein the examples are given for purposes of illustrating the improved methods and compositions embodied herein. To the accomplishment of the foregoing and related ends, this invention then comprises the features hereinafter more fully described and inherent therein, and as particularly pointed out in the claims. Such illustrative embodiments being indicative of the various ways in which the principle of our discovery, invention or improvements may be employed.

In general, the lossy dielectric composition of this disclosure consists essentially of critically prepared dielectric matrix and silicon carbide mixtures to provide a lightweight lossy dielectric of uniformly reproducible strength and properties. The disclosure consists essentially of the method for providing a matrix of selective materials whereby the dielectric properties are adjusted within certain limits to obtain improved operating characteristics for microwave attenuators or high power loads. The dielectric constant of the resulting material is within the range 9 to 20 and the loss tangents within the range 0.005 to 0.600, thus providing a range of property values capable of accommodating a wide spectrum of high power microwave energy absorption. Microwave attenuators absorb only a portion of the energy to prevent unwanted oscillations, usually at selected frequencies. Microwave loads (or terminations) are broadband devices designed to absorb and dissipate as heat as much enerby as possible. The essential, unusual feature of our materials is that they combine an outstanding range of electrical properties with high density and high thermal conductivity, as a unique combination, not heretofore known to be obtained in the art.

The proportions of matrix and conducting granules vary to provide the required dielectric properties. Attenuators require from approximately 1 percent to 35 percent by weight of conducting granules. Loads generally require conducting granules in greater amounts up to about 80 percent. Thus, in the matrix herein provided the silicon carbide granules may vary from 1 to 80 percent. It is most important that the conducting granules be uniformly dispersed during the mixing operation so that all particles are separated and surrounded by dielectric matrix. Otherwise, the composite will act as a metallic conductor and will reflect rather than absorb energy. The initial preparation of preforming or molding and sintering operations in the preferred compositions are critical from the standpoint of attaining the highest uniform density to maximize thermal conductivity, strength and hardness, and to minimize porosity.

The following detailed descriptions are illustrative of processes and compositions used to prefabricate the herein provided improved lossy dielectric matrix expressed in grams (parts) matrix in which granules of an electrically conducting metallic carbide are essentially uniformly distributed and encapsulated.

First illustrated is a preferred magnesia-based ceramic material fabricated by hot pressing. It has highly superior energy absorbing and dissipating characteristics, making it capable of absorbing and dissipating 1,800 watts of continuous wave power without failure and has exceeded the power handling capability of other material known to the art, making possible development and improvement in radar transmission.

EXAMPLE 1

1. Grind the following for 2 hours in a 1 gal. porcelain mill with 6,000 grams of alumina grinding media:
   Magnesium oxide* —800 grams
   Lithium fluoride —22.8 grams
   Distilled water —1,100 cc.

(About 97 percent based on total dry weight.)

2. Remove from mill and dry for at least 20 hours at 250°F in an air convection oven.
3. Micropulverize the dried material.
4. Mix dry the following for 10 minutes in a paddle-type blender:
   Micropulverized powder of step 3 —350 grams Silicon carbide, 280 Mesh —233 grams 5. Slowly add distilled water until a very thick but well blended paste is formed and continue blending for 30 minutes.
6. Dry paste completely.
7. Pulverize to pass a 14 mesh screen.
8. Calcine in 600 gram batches to 1,000°C for 1 hour.
9. Hot press 425 grams of the calcined material in a 2-inch diameter induction heated graphite die for ten minutes at 1,550°C under three tons total pressure. Allow to cool slowly and remove.

The composition of Example 1 may be modified within the following limits:

TABLE 1

Lossy Ceramic Compositions

| | |
|---|---|
| Magnesium oxide | 20 to 99% |
| Lithium fluoride | 0 to 5% |
| Calcium pyrophosphate | 0 to 20% |
| Manganese dioxide | 0 to 10% |
| Boron phosphate | 0 to 20% |
| Silicon carbide | 1 to 80% |

The ceramic material of Example 1 is suitable for use in microwave loads and as terminations in traveling wave tubes. With an eight-gram specimen, 1,800 watts of continuous wave power were dissipated without failure of the material. The best commercial material available, when fabricated to this geometry, failed catastrophically when subjected to about 15 watts of continuous wave power. Similarly, the efficiencies of traveling wave tubes have been greatly increased by use of the composition described. The material is otherwise especially suited to applications where medium to low dielectric constants, high thermal conductivities and very high power dissipation are required.

EXAMPLE 2

Modification of preparing the magnesia matrix can be made by altering the steps as follows:

1. Grind for about 2 to 16 hours a lossy ceramic forming composition consisting of the inorganic materials, magnesium oxide powder 20 to 97 percent, lithium fluoride 0 to 5 percent, calcium pyrophosphate 0 to 20 percent, manganese dioxide 0 to 10 percent, boron phosphate 0 to 20 percent, with distilled water therewith sufficient to form a paste of said composition combination;
2. Dry and calcine the mixture of step 1 to about 1,000°C for about one hour;
3. Micropulverize the calcined mixture;
4. Dry blend the said mixture with about 1 to 80 percent by weight particulates of silicon carbide of 100 to about 300 mesh; and
5. Hot press the dry blended mixture of step 4 under high pressure and heating the molded form for a period of about 10 minutes to one hour in a temperature range up to about 1,400°C to 1,550°C.

The combination of advantages of the material construction are indicated as follows:

1. The material is unusally efficient in converting microwave energy to thermal energy. Size and weight of components can be greatly reduced.
2. The material is very refractory and will therefore perform satisfactorily at high temperatures generated at high power levels during continuous operation. The material can be operated to 1,200°C without undergoing physical damage.
3. The material inherently has a high thermal conductivity for efficient dissipation of the heat generated.
4. The material is easily outgassed and does not interfere with typical bakeout cycles used in processing microwave power amplifier tubes. The outgassing products (principally sorbed gases) are readily removed.
5. The material, being dense and hard, is readily machined to precision dimensions required for repeatability in performance.
6. The formulation process described herein assures excellent reproducibility in preparing subsequent batches of the material.
7. The material can be metallized and brazed into a metal enclosure which improves heat dissipation and resistance to shock and vibration.
8. The material is very strong and rugged.
9. The material has a thermal expansion that is compatible with other materials of construction in microwave devices.
10. The dielectric properties of the material may be adjusted by composition changes so that matching the material to a particular application is possible.

Having described the present embodiments of our improvement in the art in accordance with the Patent Statutes, it will be apparent that some modifications and variations may be made without departing from the spirit and scope thereof. The specific embodiments described are given by way of examples illustrative of our discovery, invention or improvement which is to be limited only by the terms of the appended claims.

What is claimed is:

1. A strong lossy attenuator dielectric ceramic having a dielectric constant in the range of 9 to 20, with the loss tangents in a range of 0.005 to 0.600, a high thermal conductivity capable of withstanding electrically induced temperatures up to 1,200°C and an eight-gram specimen of which is capable of dissipating 100 to 1,800 watts of applied wave power, said ceramic consisting essentially of a fired composition of 1 to 80% by weight silicon carbide particles of 100 to about 300 mesh uniformly dispersed in and separated by a matrix consisting essentially of 20 to 97 percent magnesia, 0 to 5 percent lithium fluoride, 0 to 20 percent calcium pyrophosphate, 0 to 10 percent manganese dioxide, and 0 to 20 percent boron phosphate.

2. A ceramic of claim 1 prepared from a composition consisting essentially of (a) 350 parts of a matrix mixture of magnesia and lithium fluoride in the ratio of 800 to 22.8, and (b) 233 parts silicon carbide.

* * * * *